E. G. SYLVESTER.
HEADLIGHT.
APPLICATION FILED SEPT. 30, 1920.
1,394,694.
Patented Oct. 25, 1921.
2 SHEETS—SHEET 1.
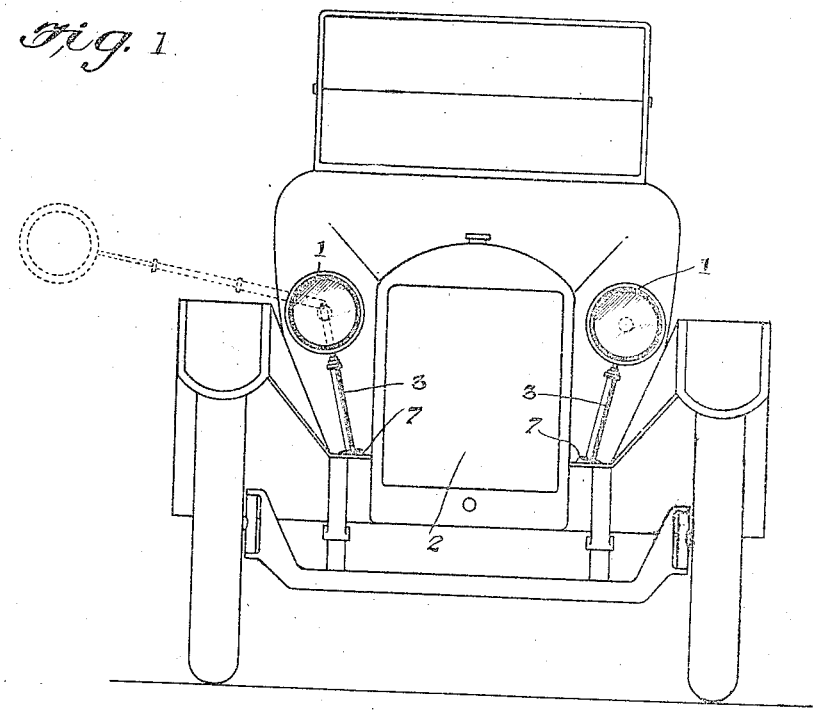
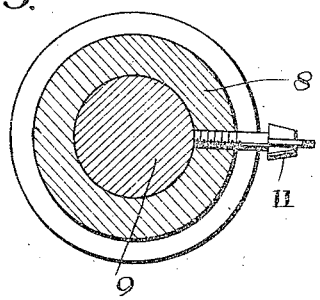
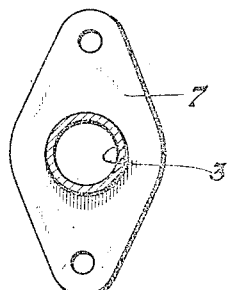
WITNESSES
INVENTOR
E. G. Sylvester,
BY
ATTORNEYS

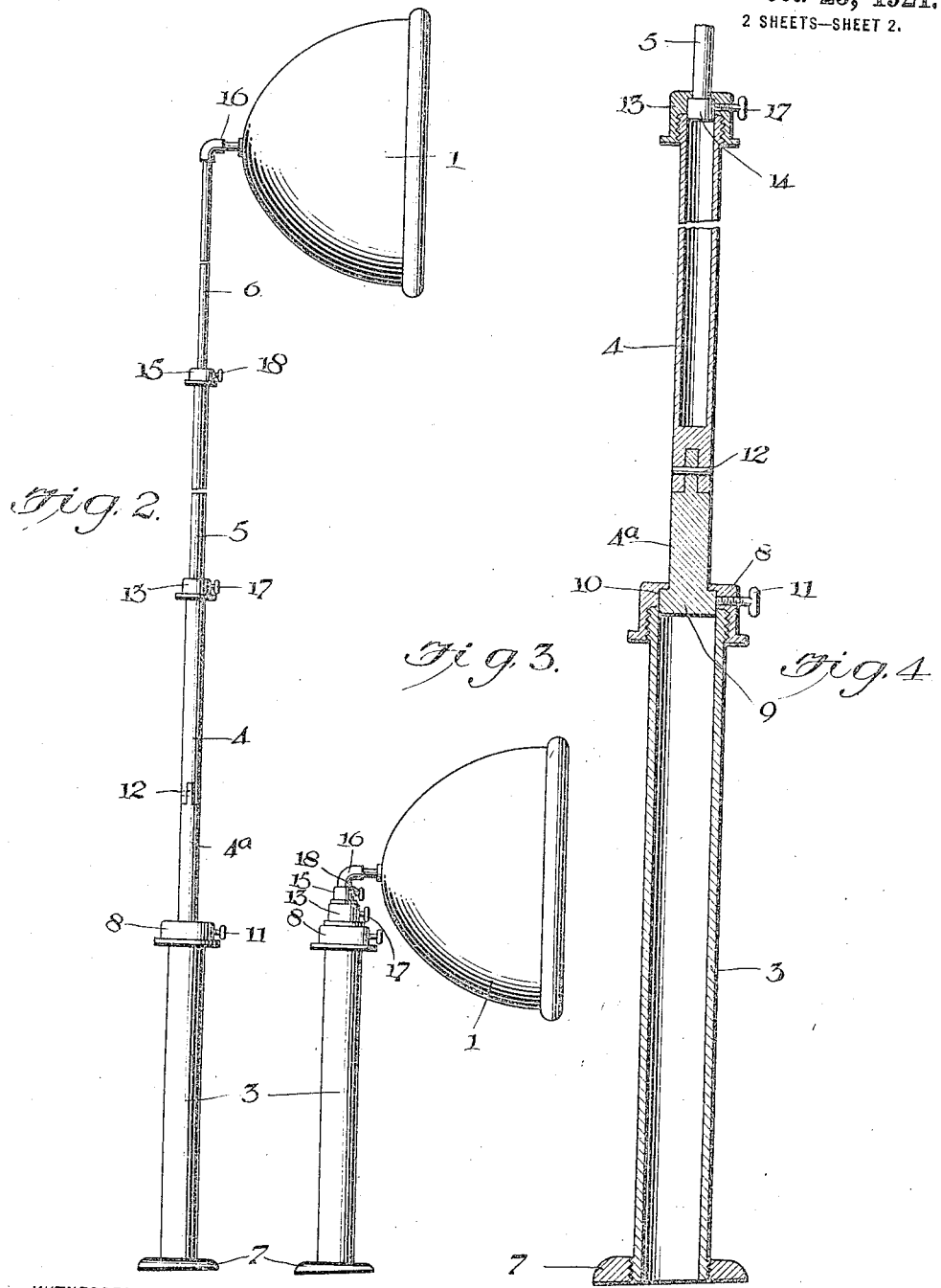

UNITED STATES PATENT OFFICE.

EDWARD GOMES SYLVESTER, OF HONOLULU, TERRITORY OF HAWAII.

HEADLIGHT.

1,394,694.   Specification of Letters Patent.   Patented Oct. 25, 1921.

Application filed September 30, 1920. Serial No. 413,710.

*To all whom it may concern:*

Be it known that I, EDWARD GOMES SYLVESTER, a citizen of the United States and a resident of Honolulu, in the Territory of Hawaii, have invented certain new and useful Improvements in Headlights, of which the following is a specification.

My invention is an improvement in head lights, and has for its object to provide a device of the character specified, especially adapted for motor vehicles, wherein the lamp is so mounted and connected with the body of the vehicle, that it may be moved toward or from the vehicle and may be turned with respect to its support to permit the lamp to turn in any desired direction, and wherein the lamp may be held in any position of adjustment.

In the drawings:

Figure 1 is a front view of a motor vehicle mounted with the improved head light.

Fig. 2 is a side view of the lamp and its support with the parts extended.

Fig. 3 is a similar view with the parts contracted.

Fig. 4 is a longitudinal section of the support.

Fig. 5 is a transverse section showing the holding mechanism.

Fig. 6 is a plan view of the foot.

In the present embodiment of the invention the lamps indicated at 1, and which are of usual construction, are connected with a telescoping support or standard which in turn is supported by the vehicle, on the connection between the front fender and the hood of the vehicle 2.

Each of the supporting standards is composed of four sections, 3, 4, and 4^A, 5, and 6. The section 3 is a tubular standard or section of pipe having at one end a foot 7, and at the other a cap 8, the said foot and cap being threaded on to the section. The foot 7 is diamond shaped and has openings at its end for receiving bolts or the like to connect it to the vehicle, and referring to Fig. 4 it will be seen that the foot is of greater thickness at one edge than at the other, and gradually tapers from one edge to the other. The edge of greatest thickness being adapted to be arranged inwardly so that standard as a whole will incline outwardly.

The cap 8 has a central opening through which is mounted to slide, the portion 4^A of the section 4—4^A. This portion 4^A has a head 9 that fits within the section 3, and this head is of greater diameter than the portion 4^A. The cap 8 has an opening through which the portion 4^A passes, and as shown at 10 the cap is reamed on counterboard to receive the head 9, a set screw 11 is threaded through the cap into engagement with the head to hold the head in the ream or counterboard. The portion 4^A of the section 4—4^A is hinged to the portion 4 of the said section, the hinge being indicated at 12, and it will be noticed referring to Fig. 4 that the portion 4^A is solid, as is also that part of the portion 4 adjacent thereto. These portions have interengaging lugs through which the hinge pin passes and the portion 4 may swing with respect to the portion 4^A.

A cap 13 similar to the cap 8 is threaded on the outer end of the portion 4 of the section 4—4^A and the section 5 has a head 14 similar to the head 9 fitting within the portion 4 of the section 4—4^A. A head 15 similar to the head 8 is threaded on to the end of the section 5, and the section 6 is mounted to slide through the cap in the same manner as section 5 is mounted to slide through the cap 13. At its outer end this section 6 has an elbow 16 with which the lamp 1 is connected, and set screws 17 and 18 are threaded through the caps 13 and 15 for holding the parts in adjusted position.

In use the head lights are arranged as shown in Fig. 1, the foot 7 of each standard being secured to the connection between the front fender and the hood at the adjacent side. The arrangement of the foot provides that the standards will lean outward toward their upper ends, that is they diverge from each other. When the parts are collapsed the lamps occupy the full line position of Fig. 1. When however, it is desired to throw the light rays in a direction not accessible from the full line position of Fig. 1, either lamp may be moved upwardly by extending the telescoping standard and by moving the section 4—4^A high enough to release the joint or hinge 12, the lamp may be swung downward as shown in broken lines in Fig. 1. The lamp may also be rotated about the axis of the support to throw the lamp rays laterally or rearwardly or in any other direction. The lamp may be elevated well about the hood and so held by means of the set screws 11 and 17 and 18. If it is not desired that the lamp be swung outwardly into the broken line position of Fig. 1, the joint 12 is not uncovered. The improved lamp is a spot light which may be directed to any desired point. It is obvious that the telescopic support may be used with either or both lamps.

I claim:

1. In combination with the head light of a motor vehicle, of means for supporting said light for vertical adjustment with respect to the vehicle, means in connection with the said supporting means for permitting the lamp to be turned angularly to reflect the rays in any direction, means in connection with the support for permitting the lamp to swing outward away from the vehicle when the support is in a predetermined position, said first named means comprising a standard composed of telescoping sections, a foot for the standard of greater thickness at one edge than at the other to support the standard in an outwardly inclined position, and means for holding said sections in adjusted position extended or collapsed, said third named means comprising a hinge interposed in the length of one of the sections.

2. In combination with the head light of a motor vehicle, of means for supporting said light for vertical adjustment with respect to the vehicle, means in connection with the said supporting means for permitting the lamp to be turned angularly to reflect the rays in any direction, means in connection with the support for permitting the lamp to swing outward away from the vehicle when the support is in a predetermined position, said first named means comprising a standard composed of telescoping sections, a foot for the standard of greater thickness at one edge than at the other to support the standard in an outwardly inclined position, and means for holding said sections in adjusted position.

3. In combination with the head light of a motor vehicle, of means for supporting said light for vertical adjustment with respect to the vehicle, means in connection with the said supporting means for permitting the lamp to be turned angularly to reflect the rays in any direction, means in connection with the support for permitting the lamp to swing outward away from the vehicle when the support is in a predetermined position and a foot for the support of greater thickness at one edge than at the other so that the support as a whole will incline outwardly.

4. A supporting standard for head lights of a motor vehicle, consisting of a series of tubular sections sliding one within the other, each succeeding section having an enlarged head sliding within the preceding section and each preceding section having a detachable cap, the succeeding section sliding therethrough and a foot at the lower end of the standard adapted to support the latter with the lamp at the upper end thereof in an outwardly inclined position.

5. A supporting standard for head lights of a motor vehicle, consisting of a series of tubular sections sliding one within the other, each succeeding section having an enlarged head sliding within the preceding section and having a detachable cap, the succeeding section sliding therethrough, said sections being rotatable one within the other, and a foot detachably secured at the lower section of the standard and at the lower end thereof and having a greater thickness at one edge than at the other to support the standard in an outwardly inclined position.

6. A supporting standard for head lights of a motor vehicle, consisting of a series of tubular sections sliding one within the other, each succeeding section having an enlarged head sliding within the preceding section and each preceding section having a detachable cap, the succeeding section sliding therethrough, said sections being rotatable one within the other, one of the said sections having a hinge in the length thereof for permitting the upper portion of the section to swing with respect to the lower portions, and a foot tapering in thickness toward one edge and threaded on the lower end of the lower section of the standard so that the standard as a whole will incline outwardly the lamps being supported at the upper end thereof.

EDWARD GOMES SYLVESTER.